(12) United States Patent
Graf

(10) Patent No.: US 7,069,112 B2
(45) Date of Patent: Jun. 27, 2006

(54) METHOD AND APPARATUS FOR CONTROLLING HANDLING DEVICES

(75) Inventor: Stefan Graf, Zusamaltheim (DE)

(73) Assignee: Kuka Roboter GmbH, Augsburg (DE)

( * ) Notice: Subject to any disclaimer, the term of this patent is extended or adjusted under 35 U.S.C. 154(b) by 190 days.

(21) Appl. No.: 10/631,976

(22) Filed: Jul. 31, 2003

(65) Prior Publication Data

US 2004/0030453 A1 Feb. 12, 2004

(30) Foreign Application Priority Data

Aug. 8, 2002 (DE) ................................ 102 36 392

(51) Int. Cl.
*G05B 19/418* (2006.01)
(52) U.S. Cl. .................... 700/248; 700/254; 318/568.1; 901/1
(58) Field of Classification Search ........ 700/245–251, 700/254, 256, 264; 318/568.1, 568.11, 568.13, 318/568.16, 573–574; 701/23; 901/1, 31, 901/41; 29/464
See application file for complete search history.

(56) References Cited

U.S. PATENT DOCUMENTS

| | | | |
|---|---|---|---|
| 6,341,246 B1 * | 1/2002 | Gerstenberger et al. .... | 700/245 |
| 6,356,806 B1 * | 3/2002 | Grob et al. ................. | 700/245 |
| 6,408,225 B1 * | 6/2002 | Ortmeier et al. ............ | 700/254 |
| 6,466,844 B1 * | 10/2002 | Ikeda et al. ................. | 700/245 |
| 6,556,891 B1 * | 4/2003 | Hietmann et al. .......... | 700/245 |
| 6,587,749 B1 * | 7/2003 | Matsumoto ................. | 700/245 |
| 6,615,112 B1 * | 9/2003 | Roos .......................... | 700/254 |
| 6,678,582 B1 * | 1/2004 | Waled ........................ | 700/245 |
| 6,776,722 B1 * | 8/2004 | De-Gol ....................... | 472/59 |
| 6,804,580 B1 * | 10/2004 | Stoddard et al. ............ | 700/248 |
| 6,807,461 B1 * | 10/2004 | Kneifel et al. .............. | 700/248 |
| 6,853,881 B1 * | 2/2005 | Watanabe et al. ........... | 700/264 |
| 2002/0029095 A1 | 3/2002 | Kosaka et al. | |

OTHER PUBLICATIONS

Bllmann, Realistic robot simulation: Multiple instantiating of robot controller software, 2002, IEEE, pp. 1149-1198.*
Afzulpurkar et al., Adaptive linear robot control for tracking adn grasping a dynamic object, 2002, IEEE, pp. 578-583.*
Agrawal et al., A new laboratory simulator for study of motion of free-floating robots relative to space targets, 1996, IEEE, pp. 627-653.*
Swevers et al., An integrated friction model structure with improved presliding behavior for accurate friction compensation, 2000, IEEE, pp. 675-686.*
Kostin et al., Modeling of Dynamics of industrial robots with flexible electric drives, 1997, IEEE, pp. 275-278.*

* cited by examiner

*Primary Examiner*—Thomas G. Black
*Assistant Examiner*—McDieunel Marc
(74) *Attorney, Agent, or Firm*—McGlew & Tuttle, P.C

(57) ABSTRACT

A method for the synchronous control of a plurality of handling devices, such as industrial robots, having a control command to be implemented by controls of the handling devices participating in a synchronization is initiated on a random control and is subsequently further processed therein as a function of the nature of the command. An apparatus suitable for performing the method has a storage device for storing a control program for the particular handling device, input device for initiating a control command to be distributed for synchronization purposes, transmitting device for transmitting an initiated command to other controls participating in a synchronization, receiving device for receiving a command transmitted by another participating control, processing device for processing the control program in accordance with the control command and optionally for checking the initiated or received command and decision device for blocking or unblocking the transmission and/or for ordering a solely local implementation of an initiated control command.

9 Claims, 3 Drawing Sheets

METHOD AND APPARATUS FOR CONTROLLING HANDLING DEVICES

FIELD OF THE INVENTION

The invention relates to a method for the synchronous control of a plurality of handling devices, such as industrial robots. It also relates to an apparatus for the synchronous control of a handling device in a union or group of a plurality of such handling devices and constructed for performing a method of the aforementioned type.

BACKGROUND OF THE INVENTION

Automated handling devices, such as industrial robots, are used for very varied tasks in modern industrial practice. It is often necessary for several robots, in each case controlled by a robot control, to perform in time-matched manner, i.e. synchronously certain handling actions. For this purpose it is generally necessary for certain operating actions to be simultaneously performed on a plurality of robot controls. Said operating actions can e.g. be the distribution of a starting command for a group of cooperating robots. In addition, certain commands are regularly linked with state conditions, which must be fulfilled on all the controls before a specific control command or program instructions initiated by the latter can be synchronously performed by a plurality of robot controls.

US 2002/0029095 A1 (corresponding to EP 1 186 286 A2) discloses a synchronous control of cooperating robots, in which one robot control functions as the master and further robot controls as slaves. The master control transmits start commands and both position and interpolation data to all the slaves and then, following the reply or acknowledgement, perform synchronous movement or control sequences with respect to a starting time. In the case of a stop command of one of the cooperating robots, all the participating robots are decelerated in accordance with an identical stopping process.

A particular disadvantage of the known control is the rigid master-slave concept, according to which at the start of a flow process one of the robots must be established as master for said process. This greatly restricts the usability of such a control. All participating robot controls contain a plurality of distinct control programs (master program, slave program, normal program), whose interaction must be determined beforehand and leading to increased programming and administration effort and expenditure, together with a corresponding, additional storage expenditure. Further disadvantages result from the data-complicated and error-prone transmission of extensive position and interpolation data referred to in the aforementioned document and necessary therein for synchronous control purposes.

Whilst avoiding the aforementioned disadvantages, the object of the invention is to provide a method or apparatus for the synchronous control of a plurality of handling devices, such as industrial robots, which is simply constructed and flexibly usable, whilst ensuring a reliable process sequence.

SUMMARY OF THE INVENTION

In the case of a method of the aforementioned type, this problem is solved in that a control command to be implemented by controls of handling devices participating in a synchronization is initiated at a random control and is subsequently further processed therein as a function of the nature of the command. For solving the set problem in a control apparatus of the aforementioned type, it is provided for the latter to have storage means for storing a control program for the handling device, input means for initiating a control command to be distributed for synchronization purposes, transmitting means for transmitting an initiated control command to other controls participating in a synchronization, receiving means for receiving a command transmitted by another participating control, processor means for processing the control program in accordance with the control command and optionally for checking the initiated or received command and decision means for unblocking or blocking the transmission and/or for ordering a solely local implementation of an initiated control command.

This provides a simple and flexibly usable method or a corresponding apparatus for the synchronous control of a plurality of handling devices, which in particular does not require a classification of the participating controls into master and slave controls and obviates the disadvantages associated therewith. A flexible, variable number of controls can therefore synchronously be controlled in the form of a group or union by means of specific control commands. There is a list of controls participating in said union, preferably by means of a list-like variable stored in the storage means of the controls. Such a variable can be redefined, also online, at any time by the user.

Since, according to a further development of the inventive control system, the controls are linked by means of a communication network, e.g. using the ethernet protocol, the control list preferably contains the IP addresses of the controls participating in the synchronization.

The communication network is preferably hierarchically flat, e.g. constructed with star topology and a central hub. Therefore all the controls are located on a common hierarchic plane.

Preferably the command processing in the method according to the invention involves the control command being distributed for synchronous implementation to the other controls or is initially locally checked.

According to a further development of the method according to the invention, the controls reciprocally communicate their present control-relevant states prior to the processing of the control command. In this way the initiating control can check the transmitted states of all the controls in accordance with a preferred development of the inventive method. The checking by the initiating control takes place under the standpoint as to whether all the preconditions linked with a distribution or implementation of a specific control command are fulfilled on all the controls. Such a condition is e.g. that no participating robots is being moved in a manual process.

According to a further development of the method according to the invention, the command processing takes place following state checking. Preferably there is no command processing in the case of negative state checking.

Due to the fact that, according to the invention, a command is possibly only locally implemented, certain control commands can also be implemented without synchronization for the particular handling device where they were originally initiated.

According to a further development of the inventive method, the state communication takes place following an interrogation by the initiating control. Thus, the communication network between the controls is only loaded with state communications at the initiation time of the control command.

In order to make as simple and operator-friendly as possible the control of robots cooperating in a cell, i.e. always or partially moving in coordinated manner with one another in space and/or time, the inventive apparatus, preferably together with the other controls, is connected to a common operating device for the controls and which can be switched to the different controls. Thus, from a central operating unit, the operator can initiate control commands to specific controls of cooperating handling devices and in this way can simply and flexibly control the robot group from the outside.

BRIEF DESCRIPTION OF THE DRAWINGS

Further advantages and features of the invention can be gathered from the following description of embodiments with reference to the attached drawings, wherein show.

DETAILED DESCRIPTION OF THE DRAWINGS

Figure 1:
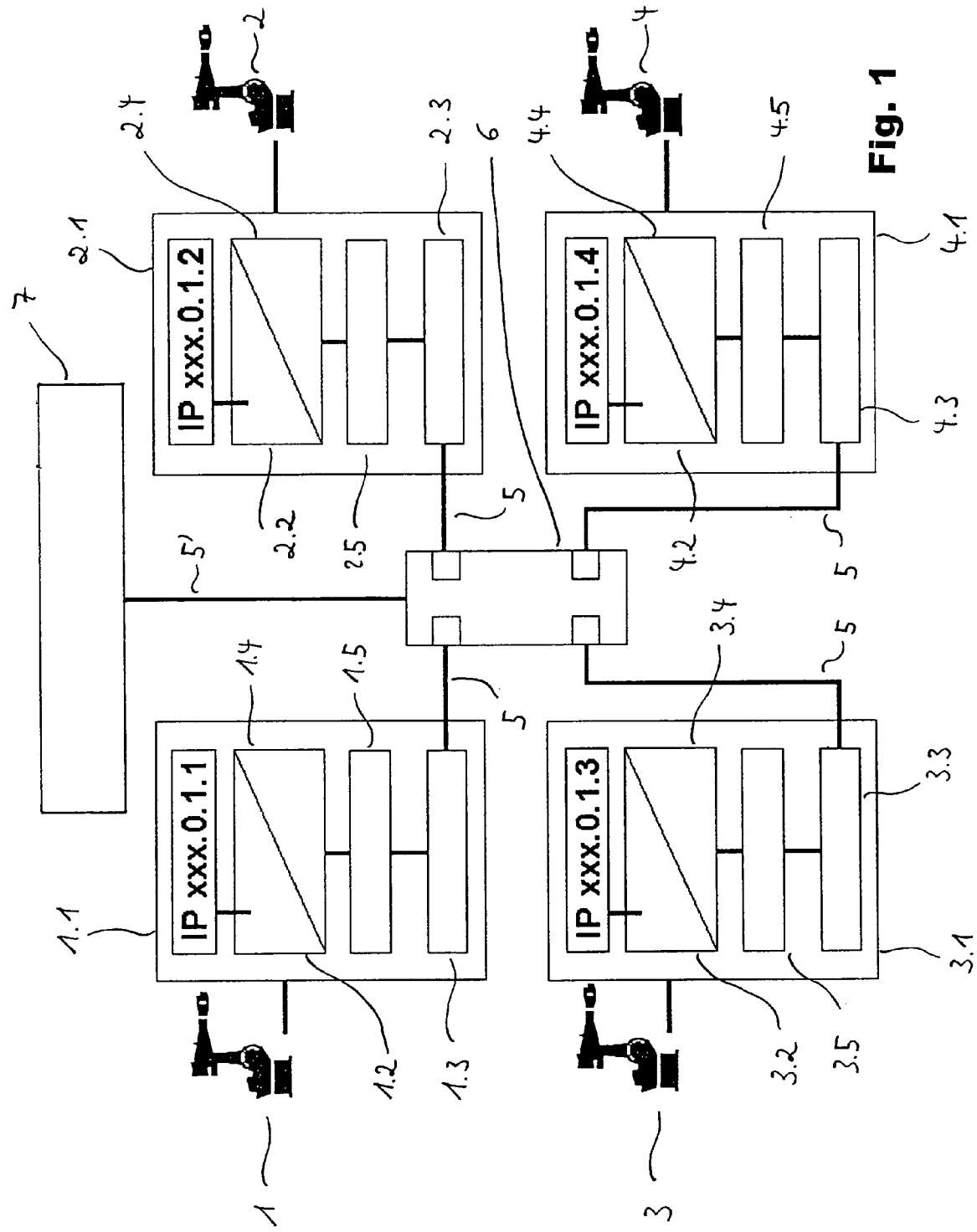
FIG. 1 A block diagram of a group of control apparatuses according to the invention.

FIG. 1 shows a plurality of robots 1, 2, 3, 4, which cooperate in a common work area or cell, i.e. which always or partly move in coordinated manner with one another in space and/or time. Each robot 1, 2, 3, 4 has a robot control 1.1, 2.1, 3.1, 4.1. Each control 1.1, 2.1, 3.1, 4.1 has storage means 1.2, 2.2, 3.2, 4.2 for storing a control program for the particular robot 1, 2, 3, 4; input means 1.3a, 2.3a, 3.3a, 4.3a for initiating a control command to be distributed for synchronization purposes; transmitting means 1.3b, 2.3b, 3.3b, 4.3b for transmitting an initiated command to other controls 1.1–4.1 participating in a synchronization; receiving means 1.3c, 2.3c, 3.3c, 4.3c for receiving a command transmitted by another participating control 1.1–4.1; processing means 1.4a, 2.4a, 3.4a, 4.4a for processing the control program in accordance with the control command and optionally for checking the initiated or received command; and decision means 1.4b, 2.4b, 3.4b, 4.4b for unblocking or blocking the transmission and/or for ordering a solely local implementation of an initiated control command.

The input means 1.3a–4.3a, transmitting means 1.3b–4.3b and receiving means 1.3c–4.3c are implemented in constructionally combined form as a network card 1.3–4.3 for each of the controls 1.1–4.1 in the embodiment according to FIG. 1. By means of the network cards 1.3–4.3 the controls 1.1–4.1 are interconnected by lines 5 and a central hub 6 via a network with star topology. The hub 6 can be constructed as a simple, passive hub or as a switching hub or switch.

For controlling the network cards 1.3–4.3, each of the controls 1.1–4.1 in the embodiment shown have suitable driver means 1.5, 2.5, 3.5, 4.5.

The processing means 1.4a, 2.4a, 3.4a, 4.4a and decision means 1.4b, 2.4b, 3.4b, 4.4b are implemented in the embodiment shown as a constructional unit in the form of a microprocessor 1.4, 2.4, 3.4, 4.4.

The inventive control system shown in FIG. 1 also has for the control of all the robots 1–4 of a cell a common operating device 7, which can be switched to the different controls 1.1–4.1. In the embodiment shown, the control device 7 is incorporated by means of a further line 5' into the communication network of the robots 1–4 and is connected to the hub 6. By means of the operating device 7, e.g. in the form of a microcomputer, the user can act on the controls 1.1–4.1 of the robots 1–4 contained in the cell, as will be explained in conjunction with FIGS. 2 and 3.

Figure 2:
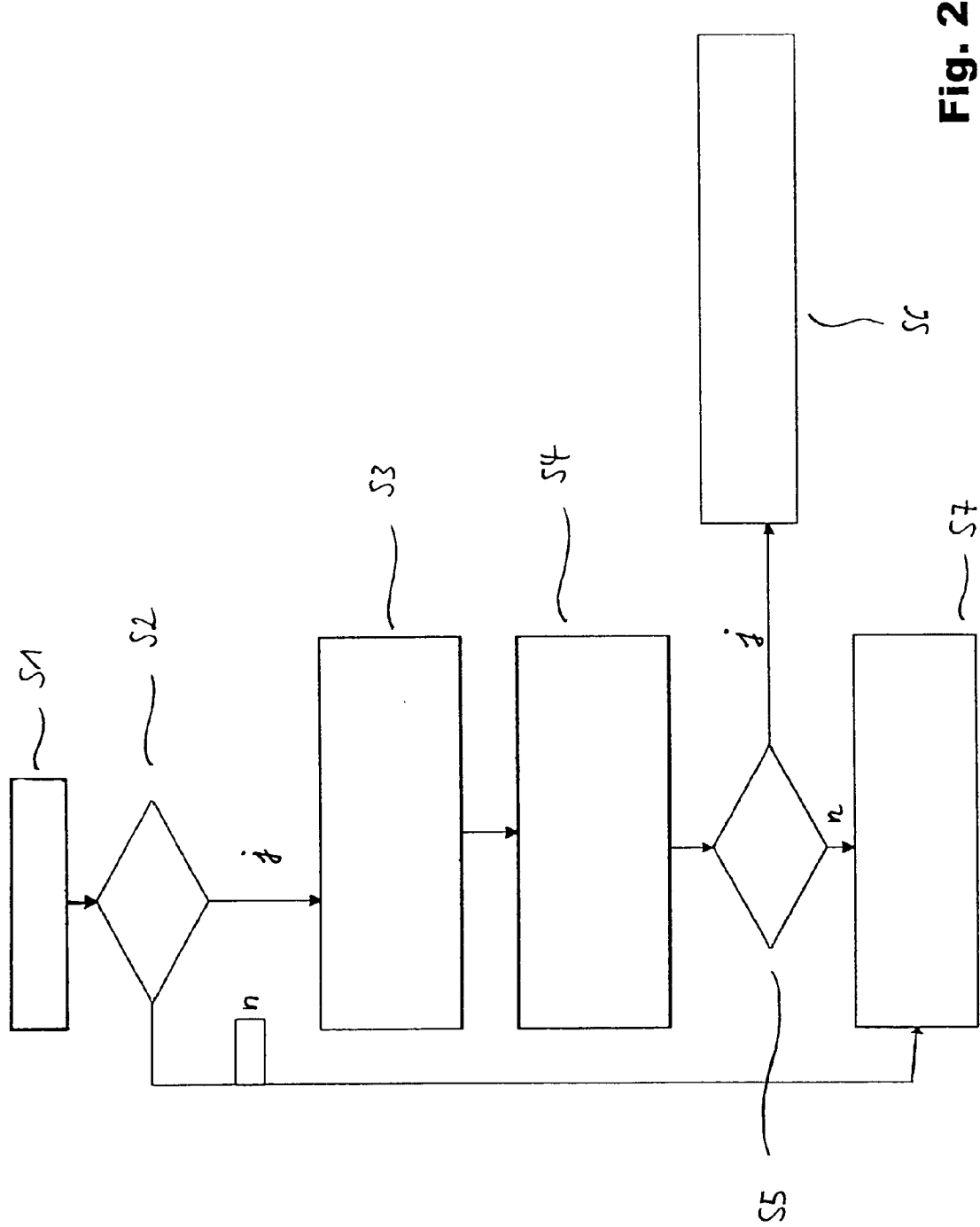
FIG. 2 A first flow chart of the inventive control method based on the starts of a robot group.

FIG. 2 describes the sequence of the inventive method for the synchronous control of a plurality of handling devices according to FIG. 1.

A control command involving a state interrogation and checking of the other participating controls by the initiating control can e.g. be a start command through which a complete robot union or group comprising several cooperating robots is optionally required, i.e. if there are no exclusion reasons such as manual operation or the like, to synchronously perform certain working or movement activities in accordance with certain programs stored in the individual robot controls.

To this end in a first step S1 the start command is given to the initiating control, also referred to as local control hereinafter. Such a control command is generally initiated from the outside by an operator, as will be explained hereinafter relative to FIG. 3. In principle this can take place on any control, which then takes over the function of the initiating control for the given command (thus, e.g. a start command given to a first control can be stopped again at a second control). Then, at step S2, there is an interrogation as to whether a robot union, in this case a start union, is projected. The local control answers the interrogation S2 by inspecting a corresponding stored variable in which a list, e.g. a list of IP addresses of the controls which optionally participate in the union, is filed. If the interrogation S2 is affirmed (j), the local control in step S3 transmits an interrogation to all the robots in the union in order to establish the states of these robots. In step S4 the replies of the interrogated robots are received. The reply data packets in each case contain information regarding the current program and physical robot states.

In parallel to the waiting for the reply data packets, in step S5 a timeout time is checked for the replies to be received from the interrogated robots. Therefore steps S4 and S5 generally take place repeatedly in alternating manner in the form of a loop (hot shown here so as not to overburden representation). On exceeding the reply time (j), in step S6 a message is sent to the user to the effect that the starts of the other or certain other controls could not yet be read, so that there is a truncation of the start command given in step S1. If at step S5 there is no exceeding of the reply time (n), at step S7 there is a further processing of the start command, as will be represented hereinafter relative to FIG. 3.

The last-mentioned step S7 is performed even if in the initial interrogation S2 no start union was established (n), i.e. the command brought about in step S1, as a result of the selection at the operating device, is only to apply for one robot control and therefore one robot.

Figure 3:
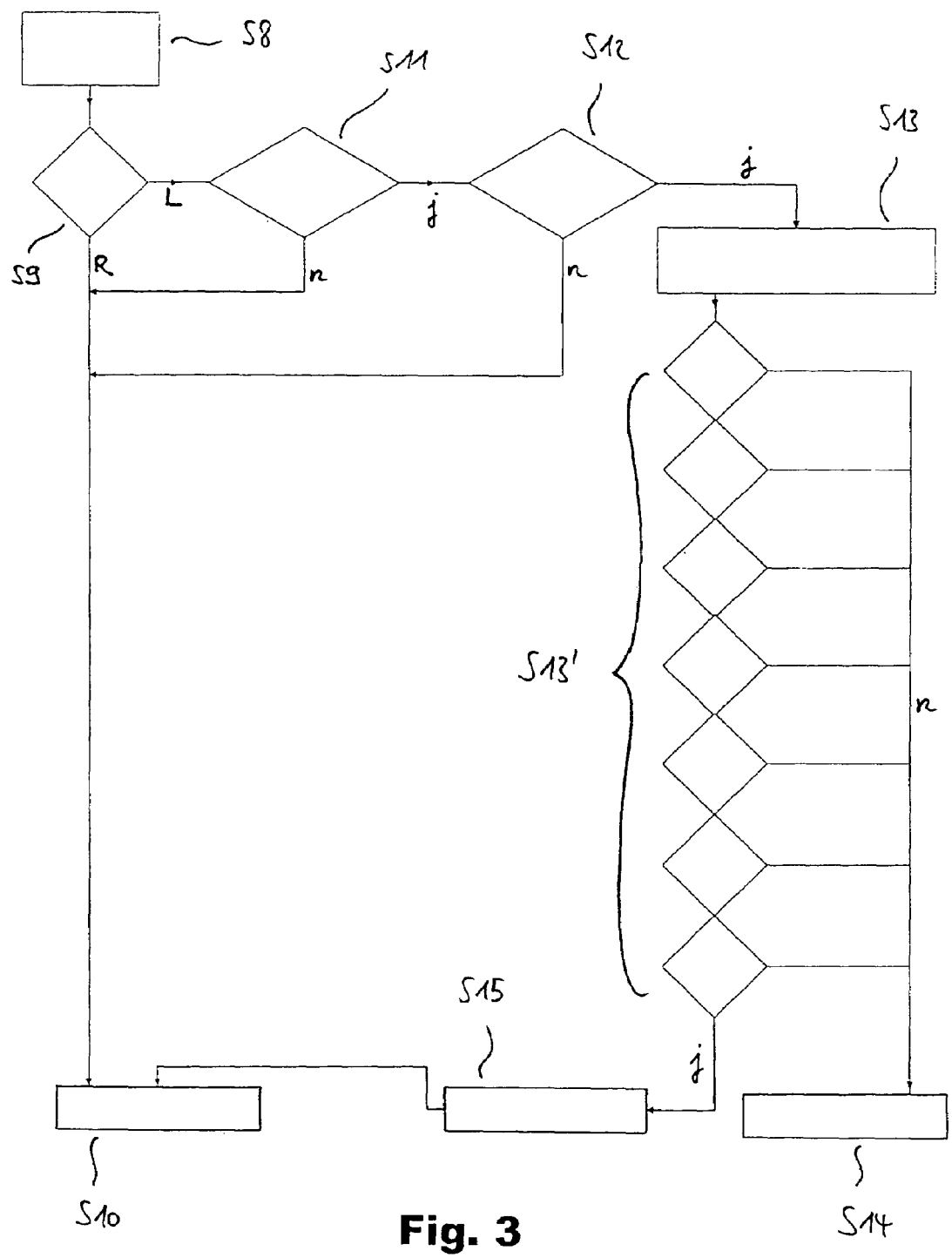
FIG. 3 A further flow chart of the inventive control method continuing the flow chart of FIG. 2.

FIG. 3 shows the fundamental sequence for the transmission of a start command to further controls participating in a synchronization and the state checking or inspection.

In step S8 the start command is fundamentally unblocked for passing on to the other controls to be synchronized (cf. S7 in FIG. 2). In step S9 there is initially an interrogation regarding the start mode. A distinction can be made between two possible start modes: a) a remote start R, in which the control command in step S8 was not locally initiated, but instead emanates from another control (this case will be further discussed in detail in conjunction with FIG. 3). In this case, directly at S10, the start command is sent to the local control. b). Otherwise the interrogation S9 reveals that it is a locally initiated instruction L. In this case at step S11 there is an interrogation as to whether the local control is within the start union. A negation (n) of the interrogation S11 once again brings about the direct start instruction to the local control in step S10. However, if the interrogation S11 is affirmed (j), there is a further interrogation S12 as to whether the local control has record coincidence, i.e. that the associated robot is geometrically on and not outside the programmed path. A negation (n) of this interrogation once again leads to step S10, whilst an affirmation (j) starts at S13, S13' a check on all the controls in the start union on the basis of the interrogation results transmitted by them (cf. FIG. 1) in connection with:

record coincidence,
non-blocking of start,
lack of a stop message,
automatic operating mode (no manual process),
robot standby,
same operating mode as the other controls, e.g. step mode or the like and
optionally further start conditions.

If one of these conditions (n) does not occur at S13', there is a global blocking of the start in step S14 and a corresponding error message is transmitted to the user. Global blocking of the start command means that neither a program sequence in the local control is started, nor is the start command transmitted to the other participating controls.

If, however, all the start conditions S13' exist (j), then the local control transmits the start command in step S15 to all the robots in the union. Then, in step S10, the start command is also sent to the local control and then a synchronous program sequence commences in the robot union.

As illustrated with respect to the starting process for cooperating robots, in the same way the following control processes can be jointly performed on several robots of a union:

same time stopping of all cooperating controls 1.1–4.1; and
aligning a program operating mode with all the controls 1.1–4.1, which ensures that in the case of a step mode on a control the other controls are in the same operating mode;
a program reset leads to the same type of reset on the other control;
in the case of record selection on a control, i.e. selection of a specific geometrical position of the robot, the corresponding record selection is performed on the other controls.

The last of the aforementioned synchronous operating actions presupposes that the programs taking place in the controls 1.1–4.1 are fundamentally identical (mirrored programs).

The list of controls participating in a union of user actions, in the described embodiment is filed in a variable, which is stored in the storage means 1.2–4.2 of the cooperating robot controls 1.1–4.1. For the activation of the aforementioned commands "synchronous record selection" and "reset" a corresponding, second variable can be stored in the storage means 1.2–4.2.

All controls 1.1–4.1 belonging to the command union reciprocally communicate their actual relevant states and the ethernet-based communication network 5, 6 between the controls 1.1–4.1 shown in FIG. 1 serves as a communication medium. On initiating a corresponding control command to be distributed to one of the controls by the user by means of the operating device 7, according to the procedure described in FIGS. 2 and 3 a check is made to establish whether in view of the states of the other controls in the union the given command is distributed in this form, blocked or merely locally performed. In the latter case a dissolving of the projected union may be necessary, because fundamentally the command execution is blocked for all the participants if a projected synchronization fails. Thus, if the user wishes to force the local command performance, he dissolves the projected union, so that all the commands are only locally performed.

The instructions synchronizable in this way more particularly comprise start and stop orders, selection instructions for the program running mode (step mode or the like), record selection and program reset commands. The invention relates to the common starting and stopping of control programs. This does not necessarily mean that the movements of the robots are or need be geometrically coupled and it merely means that the same operating action is performed on several controls without the user having to initiate a corresponding command on all the operating devices in order to effect the operating action.

For said data exchange there is no need for position data and it is merely necessary to have data concerning the actual states (drives on, record selection coincidence, stop messages applied, etc.). If the described functionality is also to be used for the common start of a geometrically coupled movement of several controls, then for functionality of a geometrically/time-coupled movement of several controls position data must also be exchanged. However, they are not necessary for start synchronization, but only for the following movement synchronization.

The described checking or inspection of the initial conditions only takes place at the start command, because for the start of the robots 1–4 in the union, it must be ensured that each individual control 1.1–4.1 performs a movement in coincidence with the selected record. Only when all the controls 1.1–4.1 and the corresponding robots 1, 2, 3, 4 are on their programmed paths, can a start be initiated in the union or group.

| REFERENCE NUMERALS LIST | |
|---|---|
| 1, 2, 3, 4 | Robot |
| 1.1, 2.1, 3.1, 4.1 | Control |
| 1.2, 2.2, 3.2, 4.2 | Storage means |
| 1.3, 2.3, 3.3, 4.3 | Network card |
| 1.3a, 2.3a, 3.3a, 4.3a | Input means |
| 1.3b, 2.3b, 3.3b, 4.3b | Transmitting means |
| 1.3c, 2.3c, 3.3c, 4.3c | Receiving means |
| 1.4, 2.4, 3.4, 4.4 | Microprocessor |
| 1.4a, 2.4a, 3.4a, 4.4a | Processing means |
| 1.4b, 2.4b, 3.4b, 4.4b | Decision means |
| 1.5, 2.5, 3.5, 4.5 | Driver means |
| 5, 5' | Line |
| 6 | Hub |
| 7 | Operating device |
| S1–S15 | Method step |
| j | Affirmed interrogation |
| n | Negated interrogation |
| L | "local" starting mode |
| R | "remote" starting mode |

The invention claimed is:

1. A method for the synchronous control of a plurality of handling devices, wherein a control command to be performed by controls of handling devices participating in a synchronization is initiated on one of the controls, initiating control, which checks current, control-relevant states of all the controls and wherein the command processing takes place after positive state checking, but does not take place in the case of negative state checking.

2. The method according to claim 1, wherein the command processing involves the control command for synchronous implementation to be distributed to the other controls, blocked or only locally implemented.

3. The method according to claim 1, wherein a state communication takes place following an interrogation by the initiating control.

4. A method for the synchronous control of a plurality of handling devices, wherein a control command to be performed by controls of handling devices participating in a synchronization is initiated on a random control (initiating control) and is then further processed therein as a function of the nature of the command, wherein the initiating control checks current, control-relevant states of all the controls.

5. An apparatus for the synchronous control of a handling device, in a union of such handling devices having:
   a. storage means for storing a control program for the handling device;
   b. input means for initiating an initiating control command to be distributed for synchronization purposes;
   c. transmitting means for transmitting the initiating control command to other controls participating in a synchronization;
   d. receiving means for receiving an initiating control command transmitted by another, participating control;
   e. processing means for processing a control program in accordance with the initiating control command and optionally for checking the initiated or received initiating control command; and
   f. decision means for blocking or unblocking the transmission and/or for ordering a solely local implementation of the initiated control command.

6. The apparatus according to claim 5, wherein the controls are linked by means of a communication network.

7. The apparatus according to claim 5, wherein it is located on a common hierarchic plane with the other participating controls.

8. The apparatus according to claim 5, wherein it is connected together with the other participating controls to a common operating device, which for operating purposes can be switched to the different controls.

9. The apparatus according to claim 5, wherein the participating controls are listed in a variable stored in the storage means.

* * * * *